United States Patent
Handl

(10) Patent No.: US 9,156,383 B2
(45) Date of Patent: Oct. 13, 2015

(54) LOCKING UNIT FOR A VEHICLE SEAT

(71) Applicant: Johnson Controls GmbH, Burscheid (DE)

(72) Inventor: Patrick Handl, Köln (DE)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 14/384,055

(22) PCT Filed: May 17, 2013

(86) PCT No.: PCT/EP2013/060235
§ 371 (c)(1),
(2) Date: Sep. 9, 2014

(87) PCT Pub. No.: WO2013/178488
PCT Pub. Date: Dec. 5, 2013

(65) Prior Publication Data
US 2015/0054320 A1   Feb. 26, 2015

(30) Foreign Application Priority Data

Jun. 1, 2012   (DE) .......................... 10 2012 015 854

(51) Int. Cl.
| *B60N 2/42* | (2006.01) |
| *B60N 2/433* | (2006.01) |
| *B60N 2/36* | (2006.01) |
| *E05B 77/04* | (2014.01) |
| *E05B 85/26* | (2014.01) |

(52) U.S. Cl.
CPC ................ *B60N 2/433* (2013.01); *B60N 2/366* (2013.01); *E05B 77/04* (2013.01); *E05B 85/26* (2013.01)

(58) Field of Classification Search
CPC ...... B60N 3/366; B60N 3/433; B60N 2/2245; B60N 2/42709
USPC ............... 297/216.1, 216.13, 216.14, 378.13, 297/378.12
See application file for complete search history.

(56) References Cited

U.S. PATENT DOCUMENTS

| 7,455,336 | B2 * | 11/2008 | Baumchen et al. ........... 292/216 |
| 7,954,898 | B2 * | 6/2011 | Van De Geer et al. ... 297/378.13 |
| 8,226,169 | B2 * | 7/2012 | Kreuels et al. ........... 297/378.13 |
| 8,342,605 | B2 * | 1/2013 | Tanaka et al. ............. 297/378.13 |
| 8,590,973 | B2 * | 11/2013 | Matsuura et al. ........ 297/378.13 |
| 8,727,443 | B2 * | 5/2014 | Vedder et al. ............ 297/378.13 |
| 2010/0102614 | A1* | 4/2010 | Kreuels et al. ........... 297/378.13 |
| 2011/0012415 | A1* | 1/2011 | Muller et al. ............ 297/378.13 |
| 2011/0254343 | A1 | 10/2011 | Vedder et al. |

FOREIGN PATENT DOCUMENTS

| DE | 42 19 429 C1 | 11/1993 |
| DE | 10 2004 021 516 A1 | 11/2005 |

(Continued)

*Primary Examiner* — Laurie Cranmer
(74) *Attorney, Agent, or Firm* — McGlew and Tuttle, P.C.

(57) ABSTRACT

A locking unit (10) for a vehicle seat (1) includes a pivotally mounted rotary latch (20) for locking to a bolt (12), and a detent (30) which secures the locking unit (10) in the locked state in the event of a crash, in which the rotary latch (20) supports itself on a first contact point against the detent (30). The rotary latch (20) also supports itself on a second contact point in the event of a deformation of the latch (20) in the event of a crash. The second contact point is provided on the detent (30).

11 Claims, 3 Drawing Sheets

(56) References Cited

FOREIGN PATENT DOCUMENTS

| DE | 10 2005 016 488 A1 | 10/2006 |
| DE | 10 2006 058 151 B3 | 12/2007 |
| DE | 20 2008 010 444 U1 | 1/2009 |
| DE | 10 2008 051 832 A1 | 4/2010 |
| DE | 20 2011 100 040 U1 | 8/2011 |
| GB | 2 034 395 A | 6/1980 |

* cited by examiner

US 9,156,383 B2

LOCKING UNIT FOR A VEHICLE SEAT

CROSS REFERENCE TO RELATED APPLICATIONS

This application is a United States National Phase Application of International Application PCT/EP2013/060235 filed May 17, 2013 and claims the benefit of priority under 35 U.S.C. §119 of German Patent Application DE 10 2012 015 854.8 filed Jun. 1, 2012, the entire contents of which are incorporated herein by reference.

FIELD OF THE INVENTION

The invention relates to a locking unit for a vehicle seat with a pivotably mounted rotary latch for locking with a bolt and with a latching pawl which, in the event of a crash, secures a locked state of the locking unit by the rotary latch being supported on a first contact point on the latching pawl. The invention also relates to a vehicle seat with the at least one locking unit.

BACKGROUND OF THE INVENTION

DE 10 2008 051 832 A1 discloses a locking unit of the type in question for a vehicle seat. A locking unit of this type comprises a pivotably mounted rotary latch for locking with a bolt. A latching pawl which is mounted pivotably about another pivot axis secures the rotary latch in the locked state. A tensioning element which is referred to as a tolerance-compensating pawl exerts a closing moment on the rotary latch and thereby eliminates play present between the rotary latch and the bolt.

The latching pawl and the tensioning element are arranged axially offset next to each other on a bearing bolt so as to be pivotable about the same axis and interact with the rotary latch. In the event of a crash, first of all only the latching pawl secures the rotary latch by the rotary latch being supported on a contact point on the latching pawl. The crash load which is transmitted by the bolt to the rotary latch in the event of a crash is absorbed here by the contact point of the rotary latch with the latching pawl.

In the event of a high crash load, the rotary latch is displaced until it comes to bear against the housing of the locking unit. This gives rise to a second contact point which can additionally absorb the crash load. A deformation of the rotary latch by the bolt can also occur.

SUMMARY OF THE INVENTION

The invention is based on an object of improving a locking unit of the type mentioned at the beginning, in particular of specifying an alternative possibility for increasing the load-absorption capacity in the event of a crash, in order to increase the crash safety of a vehicle seat.

A locking unit of the type in question for a vehicle seat comprises a pivotably mounted rotary latch for locking with a bolt, and a latching pawl which, in the event of a crash, secures a locked state of the locking unit by the rotary latch being supported on a first contact point on the latching pawl. According to the invention, it is provided that, during a deformation in the event of a crash, the rotary latch is additionally supported on a second contact point, the second contact point being provided on the latching pawl.

Owing to the fact that, in the event of a crash, when the rotary latch is deformed, there is in addition to the first contact point with the latching pawl also a second contact point with the latching pawl, the crash load transmitted by the bolt to the rotary latch can be absorbed by two contact points. The load-absorbing capability of the locking unit is therefore increased.

The rotary latch is advantageously mounted pivotably here about a first bearing bolt, and the latching pawl is mounted pivotably about a second bearing bolt, the bearing bolts running offset in parallel.

Owing to the geometrical arrangement of the rotary latch and of the latching pawl on two bearing bolts which are offset in parallel and each define a pivot axis, it is relatively simple to ensure that, during the locking and unlocking of the locking device, the second contact point does not exist and therefore does not obstruct locking or unlocking.

The second contact point is realizable in a relatively simple manner in that the latching pawl has a latching pawl cutout which is bounded by a latching pawl step which forms the second contact point during the deformation in the event of a crash.

For the interaction with the second contact point, the rotary latch advantageously has a lug which, in the locked state, projects into the latching pawl cutout.

During the deformation in the event of a crash, the rotary latch is advantageously in self-locking contact with the latching pawl at the second contact point. Opening of the locking device is thereby prevented.

According to an advantageous refinement of the invention, during the deformation in the event of a crash, the rotary latch bears in a form-fitting manner against the second contact point.

It is particularly advantageous in this case if the second contact point has a toothing with which a rotary latch toothing of the rotary latch enters into toothed engagement during the deformation in the event of a crash.

If, in the locked state, a tensioning element exerts a closing moment on the rotary latch, a play present between the rotary latch and the bolt can thereby be eliminated.

According to an advantageous refinement of the invention, the rotary latch and the latching pawl are arranged within an at least partially closed housing.

The object is also achieved by a vehicle seat with at least one locking unit according to the invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
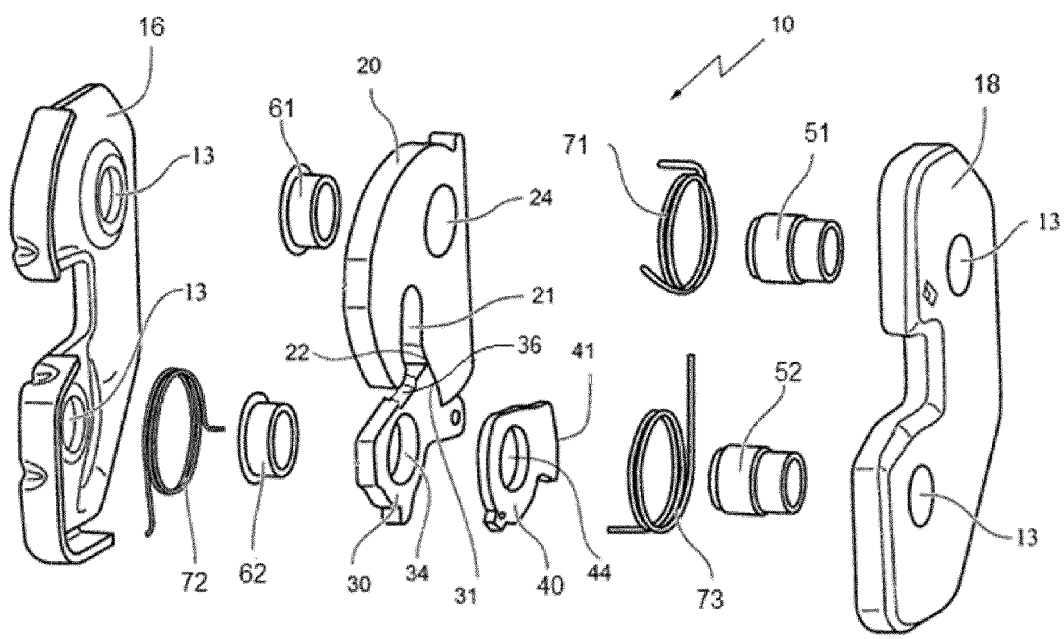
FIG. 1 is an exploded illustration of a locking unit.

Referring to the drawings in particular, in a motor vehicle, a locking unit 10 for connecting a backrest 3 of a vehicle seat 1, in particular a rear seat, to a vehicle structure is provided. The backrest 3 here is attached to a seat part 5 so as to be pivotable from a use position into a not-in-use position.

However, the locking unit 10 can also be used at different locations, for example for fastening the seat part 5 of the vehicle seat 1 to the floor structure of the motor vehicle, or in a door lock.

The arrangement of the vehicle seat 1 within the vehicle and the customary direction of travel thereof define the directional details used below. A direction oriented perpendicularly to the ground is referred to below as the vertical direction and a direction perpendicular to the vertical direction and perpendicular to the direction of travel is referred to below as the transverse direction.

The locking unit 10 has a lock housing which comprises a first side plate 16 and a second side plate 18. In the present case, the basic surfaces of the side plates 16, 18 are of flat configuration and are arranged in a plane defined by the direction of travel and the vertical direction, i.e. perpendicularly to the transverse direction. Each of the side plates 16, 18 comprises two bearing bores 13 which, in the present case, are of circular design.

The first side plate 16 and the second side plate 18 form a receptacle which opens in the direction of a bolt 12 in order to receive the latter for locking purposes. The locking unit 10 in the present case is fastened to the backrest 3 and the bolt 12 is fastened to the vehicle structure. It is also conceivable for the locking unit 10 to be fastened to the vehicle structure and for the bolt 12 to be fastened to the backrest 3. That portion of the bolt 12 which is to be received by the receptacle generally runs horizontally in the transverse direction.

A rotary latch 20 is mounted pivotably on a first bearing bolt 51 which, in turn, is fastened to the first side plate 16 and to the second side plate 18. For this purpose, the rotary latch 20 has a rotary latch hole 24 which is penetrated by the first bearing bolt 51. The rotary latch 20 furthermore has a hook mouth 21 for interaction with the bolt 12. The rotary latch 20 is pretensioned in the opening direction by means of a first spring 71.

The rotary latch 20 has a functional surface 22 which partially laterally bounds the hook mouth 21. In the locked state, the functional surface 22 approximately faces in the direction of a second bearing bolt 52 which is arranged parallel to the first bearing bolt 51 and therefore likewise runs in the transverse direction. In the present case, the functional surface 22 is of planar design, but can also be, for example, curved in the shape of an arc of a circle and of concave design.

On that side of the hook mouth 21 which faces away from the rotary latch hole 24 and is opposite the functional surface 22, the hook mouth 21 is bounded laterally by a lug 28 of the rotary latch 20.

The rotary latch 20 has a basic body which is bounded in the axial direction by a flat basic surface in each case. The width of the functional surface 22 corresponds to the thickness of the basic body of the rotary latch 20, i.e. to the extent of the basic body in the axial direction.

The first bearing bolt 51 is inserted into respective bearing bores 13 in the side plates 16, 18 and protrudes perpendicularly from the basic surfaces of the side plates 16, 18. The first bearing bolt 51 therefore runs horizontally in the transverse direction. In the present case, the preferably metallic first bearing bolt 51 is riveted or calked to the side plates 16, 18. The first bearing bolt 51 is preferably designed in the form of a hollow cylinder in order to receive a fastening means, for example a screw, by means of which the locking unit 10 is fastened to the backrest 3 during the installation.

The second bearing bolt 52 is also inserted into respective bearing bores 13 in the side plates 16, 18 and protrudes perpendicularly from the basic surfaces of the side plates 16, 18. The second bearing bolt 52 therefore likewise runs horizontally in the transverse direction. In the present case, the preferably metallic second bearing bolt 52 is riveted or calked to the side plates 16, 18. In the same manner as the first bearing bolt 51, the second bearing bolt 52 is preferably designed in the form of a hollow cylinder in order to receive a fastening means, for example a screw, by means of which the locking unit 10 is fastened to the backrest 3 during the installation.

A tensioning element 40 is mounted pivotably on the second bearing bolt 52. For this purpose, the tensioning element 40 has a tensioning element hole 44 which, in the present case, is circular and is penetrated by the second bearing bolt 52. The tensioning element 40 is pretensioned toward the rotary latch 20 by means of a third spring 73.

In the locked state, when the hook mouth 21 of the rotary latch 20 receives the bolt 12, the tensioning element 40 exerts a closing moment on the rotary latch 20 owing to the pretensioning by the third spring 73 as a securing element. For this purpose, the tensioning element 40 has a tensioning surface 41 which is curved eccentrically with respect to the second bearing bolt 52 and is in non-self-locking contact with the functional surface 22 of the rotary latch 20. In the present case, the tensioning surface 41 is curved in the shape of an arc of a circle and is of convex design.

A latching pawl 30 is arranged on the second bearing bolt 52 axially next to the tensioning element 40 and is likewise mounted pivotably on the second bearing bolt 52, i.e. in alignment with the tensioning element 40. For this purpose, the latching pawl 30 has a latching pawl hole 34 which, in the present case, is circular and is penetrated by the second bearing bolt 52. The latching pawl 30 is pretensioned toward the rotary latch 20 by means of a second spring 72.

In the present case, the latching pawl 30 is arranged adjacent to the first side plate 16 and, in the present case, the tensioning element 40 is arranged adjacent to the second side plate 18. The latching pawl 30 and the tensioning element 40 are coupled by empty travel for carrying-along purposes, for example by means of a slot and pin guide or by means of an axially protruding driver.

The latching pawl 30 has a latching surface 31 which is in the vicinity of the tensioning surface 41 of the tensioning element 40. In the locked state, the latching surface 31 is positioned spaced apart from the functional surface 22 of the rotary latch 20. In the present case, the latching surface 31 is curved in the shape of an arc of a circle and is of convex design, but may also be planar.

The width of the functional surface 22, which corresponds to the thickness of the basic body of the rotary latch 20, also approximately corresponds to the total of the thickness of the latching pawl 30 and the thickness of the tensioning element 40. The rotary latch 20 therefore has approximately the same material thickness as the latching pawl 30 and the tensioning element 40 together.

The latching pawl 30 furthermore has a latching pawl cutout 36 which is bounded radially inward, i.e. in the direction of the latching pawl hole 34, by a latching pawl step 38.

Figure 2:
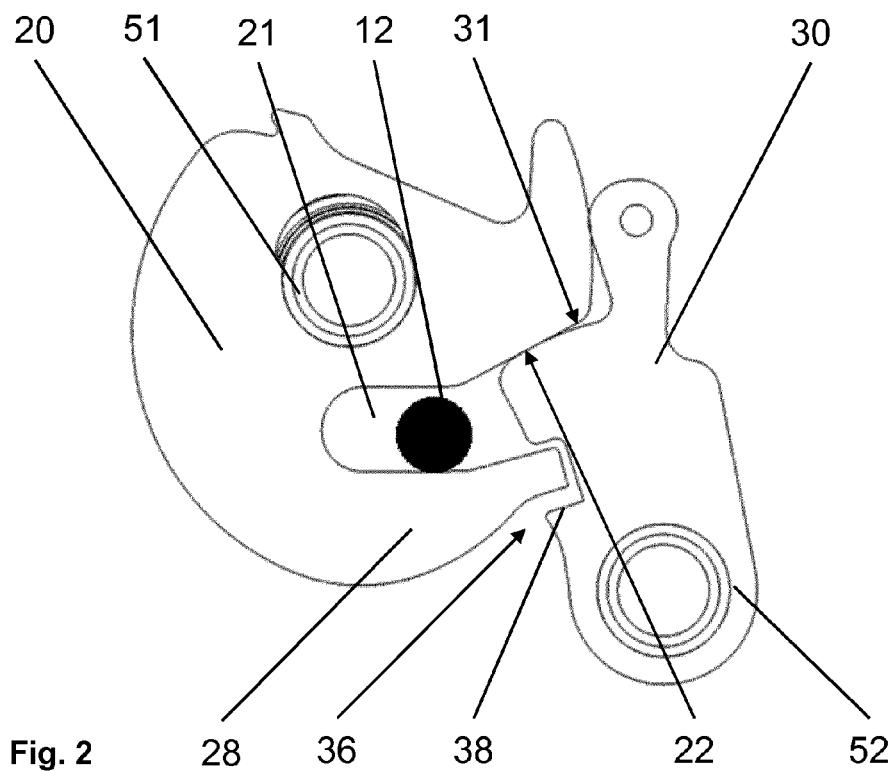
FIG. 2 is a top view of parts of the locking unit according to a first exemplary embodiment in the event of a crash.

FIG. 2 illustrates the positions of the rotary latch 20 and the latching pawl 30 of the locking unit 10 according to a first exemplary embodiment in the event of a crash.

The bolt 12 bears against the lug 28 of the rotary latch 20 in the hook mouth 21. In the event of a crash, the rotary latch 20 experiences an opening moment by means of the bolt 12 and pushes the tensioning element 40 (not illustrated here) away.

As a result, the latching surface 31 of the latching pawl 30 enters into contact with the functional surface 22 of the rotary latch 20.

The latching pawl 30 thus serves to support the rotary latch 20 and, as a securing element, prevents a further rotation of the rotary latch 20 in the opening direction. The latching pawl 30 therefore prevents the rotary latch 20 from opening.

The lug 28 of the rotary latch 20 projects in this position into the latching pawl cutout 36 of the latching pawl 30, but without touching the latching pawl 30.

Figure 3:
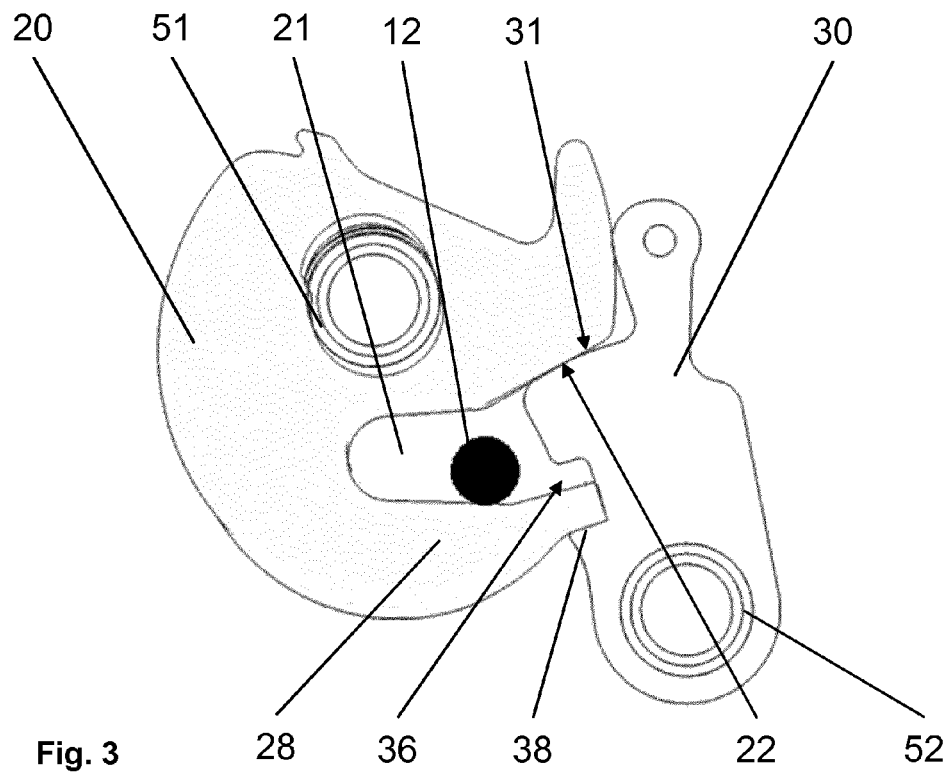
FIG. 3 is a top view of the parts of the locking unit according to FIG. 2 in the event of a crash after deformation of the rotary latch.

FIG. 3 illustrates the positions of the rotary latch 20 and of the latching pawl 30 of the locking unit 10 according to the first exemplary embodiment in the event of a crash after deformation of the rotary latch 20.

After a relatively severe crash, the rotary latch 20 experiences a further opening moment by means of the bolt 12 bearing against the lug 28 in the hook mouth 21. However, because of the contact of the latching surface 31 against the functional surface 22, the latching pawl 30 prevents further rotation of the rotary latch 20.

As a result, the rotary latch 20 experiences deformation in the direction of movement of the bolt 12. The tip of the lug 28, which projects into the latching pawl cutout 36 of the latching pawl 30, moves toward the latching pawl step 38 of the latching pawl 30 and comes to bear there. Further deformation of the lug 28 of the rotary latch 20 in the direction of movement of the bolt 12 is therefore prevented.

In this position, the rotary latch 20 has two contact points with the latching pawl 30. Firstly, the functional surface 22 of the rotary latch 20 bears against the latching surface 31 of the latching pawl 30, and, secondly, the tip of the lug 28 of the rotary latch 20 bears against the latching pawl step 38 of the latching pawl 30.

If the bolt 12 then exerts a further opening moment on the rotary latch 20, said moment is supported on the two contact points mentioned between the rotary latch 20 and the latching pawl 30.

Figure 4:
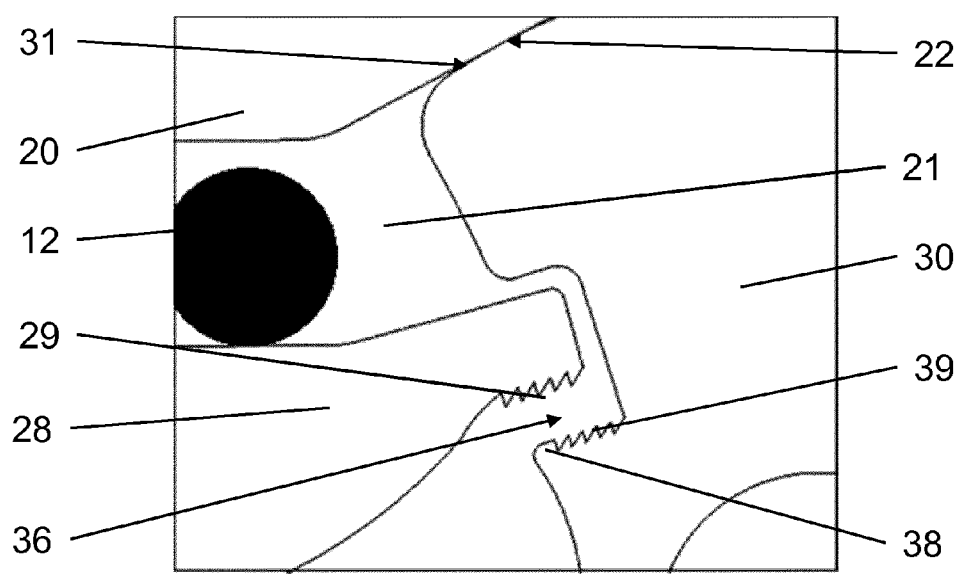
FIG. 4 is a detailed illustration of parts of the locking unit according to a second exemplary embodiment in the event of a crash.
Figure 5:
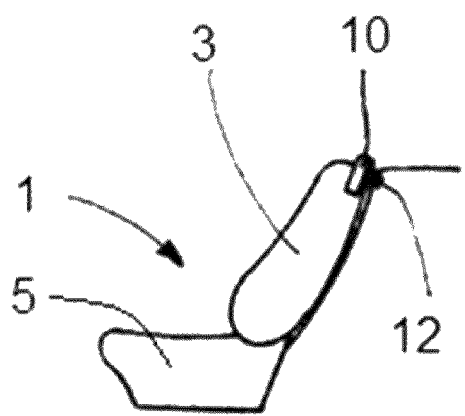
FIG. 5 is a schematized illustration of a vehicle seat.

FIG. 4 illustrates, in a detailed view, the positions of the rotary latch 20 and of the latching pawl 30 of the locking unit 10 according to a second exemplary embodiment in the event of a crash.

On the side facing away from the hook mouth 21, i.e. facing radially outward, the lug 28 of the rotary latch 20 has a rotary latch toothing 29. The latching pawl 30 has a latching pawl toothing 39 for interaction with the rotary latch toothing 29 of the rotary latch 20 in the event of a crash. The latching pawl toothing 39 is attached here on the latching pawl step 38 within the latching pawl cutout 36.

In the event of a crash, the rotary latch 20 experiences an opening moment by means of the bolt 12 bearing against the lug 28 of the rotary latch 20 in the hook mouth 21 and pushes the tensioning element 40 (not illustrated here) away. As a result, the latching surface 31 of the latching pawl 30 enters into contact with the functional surface 22 of the rotary latch 20.

In this position, the lug 28 of the rotary latch 20 projects into the latching pawl cutout 36 of the latching pawl 30, but without touching the latching pawl 30. The latching pawl toothing 39 and the rotary latch toothing 29 are therefore remote from each other.

After a relatively severe crash, the rotary latch 20 undergoes a further opening moment by means of the bolt 12 bearing against the lug 28 in the hook mouth 21. As a result, the lug 28 of the rotary latch 20 undergoes deformation in the direction of movement of the bolt 12, and the tip of the lug 28, which projects into the latching pawl cutout 36 of the latching pawl 30, moves in the process toward the latching pawl step 38 of the latching pawl 30.

In this position (not illustrated here), the latching pawl toothing 39 of the latching pawl 30 comes to bear against the rotary latch toothing 29 of the rotary latch 20 and enters into toothed engagement therewith. Further deformation of the lug 28 of the rotary latch 20 in the direction of movement of the bolt 12 is therefore prevented.

Furthermore, the toothed engagement of the latching pawl toothing 39 with the rotary latch toothing 29 prevents the lug 28 of the rotary latch 20 from being pulled out of the latching pawl cutout 36 of the latching pawl 30. The toothed engagement of the latching pawl toothing 39 with the rotary latch toothing 29 acts as an additional form-fitting connection between the rotary latch 20 and the latching pawl 30.

In this position (not illustrated here), the rotary latch 20 has two contact points with the latching pawl 30. Firstly, the functional surface 22 of the rotary latch 20 bears against the latching surface 31 of the latching pawl 30, and, secondly, the rotary latch toothing 29 of the rotary latch 20 enters into toothed engagement with the latching pawl toothing 39 of the latching pawl 30.

If the bolt 12 then exerts a further opening moment on the rotary latch 20, said moment is supported on the two contact points mentioned between the rotary latch 20 and the latching pawl 30.

It is also conceivable to configure the latching pawl 30 in such a manner that the latter undergoes deformation because of the force transmitted by the rotary latch 20. Owing to said targeted deformation, the latching pawl cutout 36 is compressed and reduced in the radial direction until the lug 28 of the rotary latch 20 is clamped from two sides between the latching pawl step 38 and the opposite wall of the latching pawl cutout 36.

In all of the exemplary embodiments described here, the first bearing bolt 51, as illustrated in FIG. 1, is encased by a first slide bush 61. The first slide bush 61 is also designed in the form of a hollow cylinder. The first slide bush 61 is therefore located in the radial direction between the first bearing bolt 51 and the rotary latch 20.

As illustrated in FIG. 1, the second bearing bolt 52 is encased by a second slide bush 62. The second slide bush 62 is also designed in the form of a hollow cylinder. The second slide bush 62 is therefore located in the radial direction between the first bearing bolt 51 and the latching pawl 30 and also the tensioning element 40.

The first sliding bush 61 and the second sliding bush 62 can also be omitted or formed integrally with the first bearing bolt 51 and the second bearing bolt 52.

In the locked state of the locking unit 10, the bolt 12 is located in the receptacle formed by the side plates 16, 18 and in the hook mouth 21 of the closed rotary latch 20. The tensioning element 40 secures the rotary latch 20 by interaction of the tensioning surface 41 with the functional surface 22. The latching surface 31 of the latching pawl 30 is slightly spaced apart from the functional surface 22 of the rotary latch 20.

In order to open the locking unit 10, the latching pawl 30 is pivoted away from the rotary latch 20, as a result of which the latching surface 31 of the latching pawl 30 is further away from the functional surface 22 of the rotary latch 20. The latching pawl 30 carries along the tensioning element 40 owing to the carrying-along coupling, and therefore the rotary latch 20 is no longer secured.

By means of the pretensioning on account of the first spring 71, the rotary latch 20 opens, i.e. pivots in the opening direction. Alternatively, or in addition to, the pretensioning by the first spring 71, the rotary latch 20 can also be carried along for opening purposes by the latching pawl 30 or by the tensioning element 40.

Owing to the pivoting movement of the rotary latch 20, the hook mouth 21 draws back from the receptacle formed by the side plates 16, 18 and releases the bolt 12 which moves away from the locking unit 10 counter to the pivoting-in direction. If the bolt 12 has left the hook mouth 21, the locking unit 10 is in the unlocked state.

If, in said unlocked state, the bolt 12 passes again into the receptacle formed by the side plates 16, 18 and enters into contact with the border of the hook mouth 21, the bolt 12 pushes the rotary latch 20 into the closed position thereof. The tensioning element 40, owing to the pretensioning thereof by the third spring 73, moves along the functional surface 22. Carried along by the tensioning element 40 or owing to the pretensioning by the second spring 72, the latching pawl 30 pivots toward the rotary latch 20, with the latching surface 31 approaching the functional surface 22 of the rotary latch 20. The locking unit 10 is then in the locked state again.

The features disclosed in the above description, the claims and the drawings can be of importance both individually and in combination for realizing the invention in the various configurations thereof.

While specific embodiments of the invention have been shown and described in detail to illustrate the application of the principles of the invention, it will be understood that the invention may be embodied otherwise without departing from such principles.

The invention claimed is:

1. A locking unit for a vehicle seat, the locking unit comprising:
   a pivotably mounted rotary latch for locking with a bolt; and
   a latching pawl which, in the event of a crash, secures a locked state of the locking unit by the rotary latch being supported on a first contact point on the latching pawl, characterized in that, when the rotary latch is deformed in the event of a crash, the rotary latch is additionally supported on a second contact point, the second contact point being provided on the latching pawl, wherein:
   the latching pawl has a latching pawl cutout bounded by a latching pawl step which forms the second contact point during the deformation in the event of a crash;
   the rotary latch has a lug which, in the locked state, projects into the latching pawl cutout;
   during deformation in the event of a crash, the rotary latch bears in a form-fitting manner against the second contact point; and
   the second contact point has a toothing with which a rotary latch toothing of the rotary latch enters into toothed engagement during the deformation in the event of a crash.

2. The locking unit as claimed in claim 1, wherein the rotary latch is mounted pivotably about a first bearing bolt, and the latching pawl is mounted pivotably about a second bearing bolt, the bearing bolts running offset in parallel.

3. The locking unit as claimed in claim 1 wherein, during the deformation in the event of a crash, the rotary latch is in self-locking contact with the latching pawl at the second contact point.

4. The locking unit as claimed in claim 1 wherein, in the locked state, a tensioning element exerts a closing moment on the rotary latch.

5. The locking unit as claimed in claim 1 wherein the rotary latch and the latching pawl are arranged within an at least partially closed housing.

6. A vehicle seat, comprising at least one locking unit, the locking unit comprising:
   a pivotably mounted rotary latch for locking with a bolt; and
   a latching pawl which, in the event of a crash, secures a locked state of the locking unit by the rotary latch being supported on a first contact point on the latching pawl, characterized in that, when the rotary latch is deformed in the event of a crash, the rotary latch is additionally supported on a second contact point, the second contact point being provided on the latching pawl, wherein:
   the latching pawl has a latching pawl cutout bounded by a latching pawl step which forms the second contact point during the deformation in the event of a crash;
   the rotary latch has a lug which, in the locked state, projects into the latching pawl cutout;
   during deformation in the event of a crash, the rotary latch bears in a form-fitting manner against the second contact point; and
   the second contact point has a toothing with which a rotary latch toothing of the rotary latch enters into toothed engagement during the deformation in the event of a crash.

7. The vehicle seat as claimed in claim 6, wherein:
   the rotary latch is mounted pivotably about a first bearing bolt; and
   the latching pawl is mounted pivotably about a second bearing bolt, the bearing bolts running offset in parallel.

8. The vehicle seat as claimed in claim 7, wherein, during the deformation in the event of a crash, the rotary latch is in self-locking contact with the latching pawl at the second contact point.

9. The vehicle seat as claimed in claim 6, wherein, during the deformation in the event of a crash, the rotary latch is in self-locking contact with the latching pawl at the second contact point.

10. The vehicle seat as claimed in claim 6, wherein, in the locked state, a tensioning element exerts a closing moment on the rotary latch.

11. The vehicle seat as claimed claim 6, further comprising an at least partially closed housing wherein the rotary latch and the latching pawl are arranged within the at least partially closed housing.

* * * * *